R. R. HUGHES, Jr.
EDGING MACHINE.
APPLICATION FILED AUG. 19, 1915.

1,278,660.

Patented Sept. 10, 1918.
7 SHEETS—SHEET 1.

Witness

Inventor
Robert R. Hughes Jr.
By Sturtevant Mason
Attorneys

R. R. HUGHES, Jr.
EDGING MACHINE.
APPLICATION FILED AUG. 19, 1915.

1,278,660.

Patented Sept. 10, 1918.
7 SHEETS—SHEET 3.

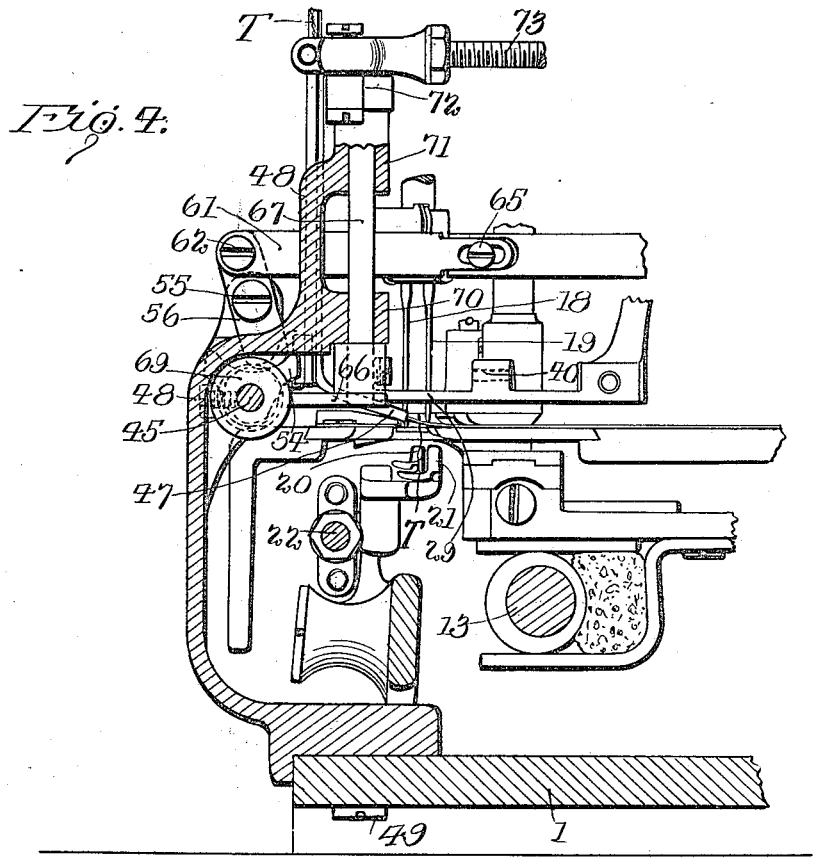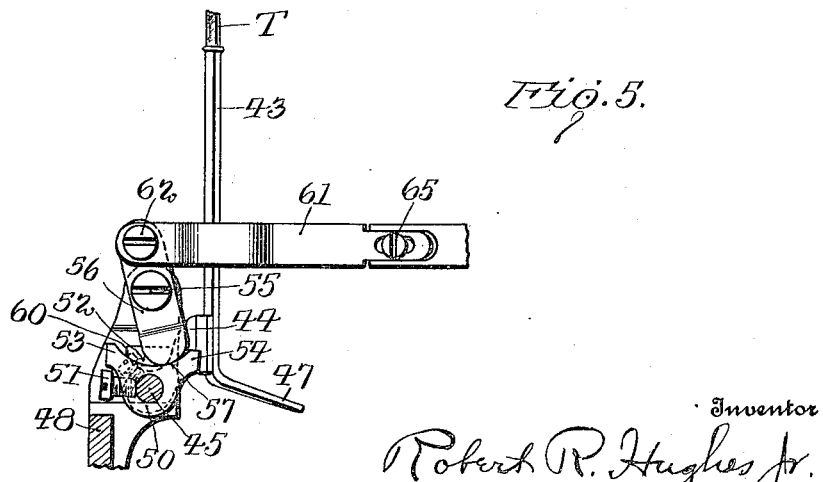

R. R. HUGHES, Jr.
EDGING MACHINE.
APPLICATION FILED AUG. 19, 1915.
1,278,660.
Patented Sept. 10, 1918.
7 SHEETS—SHEET 5.
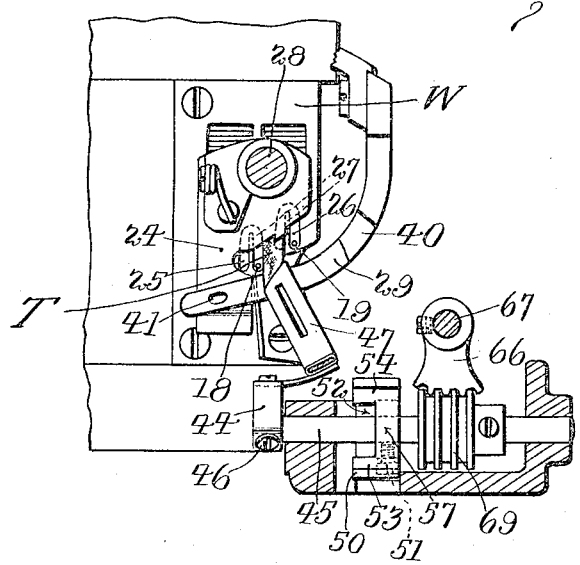
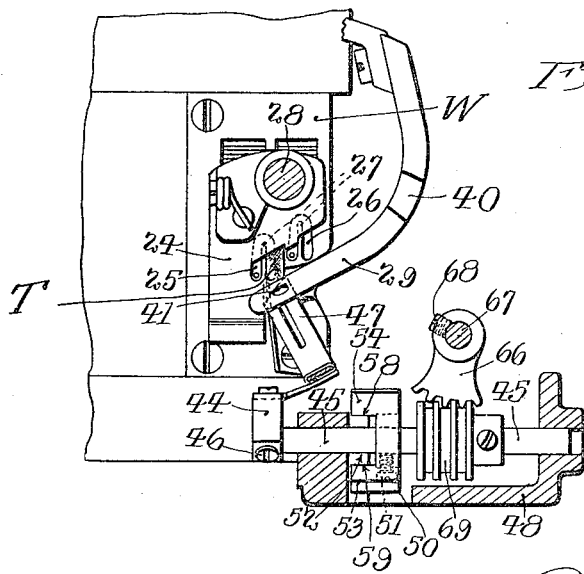

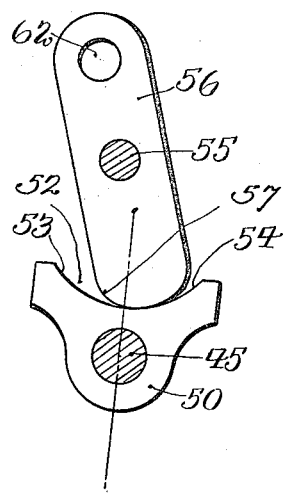
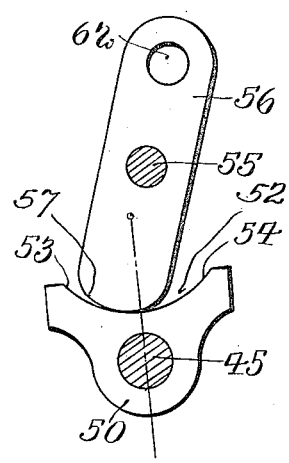
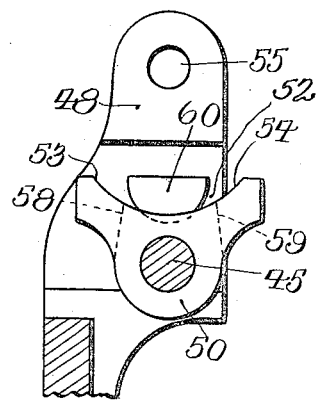
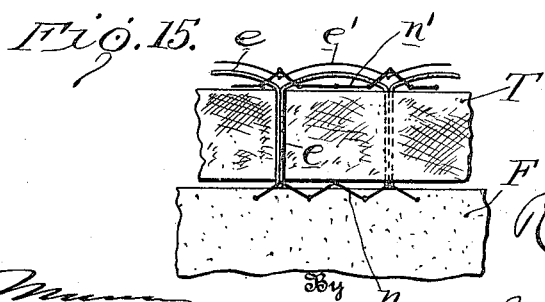

R. R. HUGHES, Jr.
EDGING MACHINE.
APPLICATION FILED AUG. 19, 1915.
1,278,660.
Patented Sept. 10, 1918.
7 SHEETS—SHEET 7.
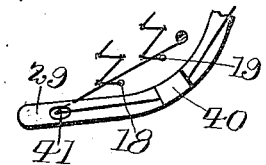
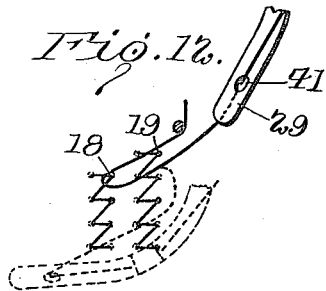
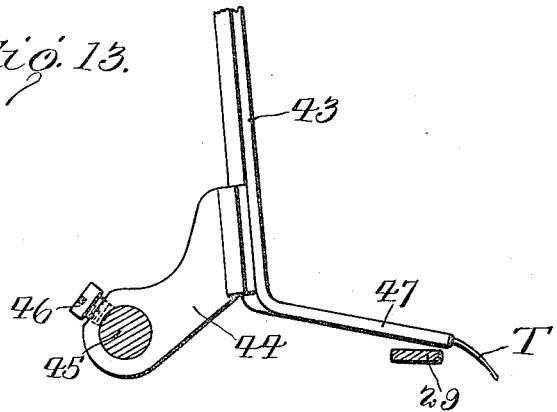
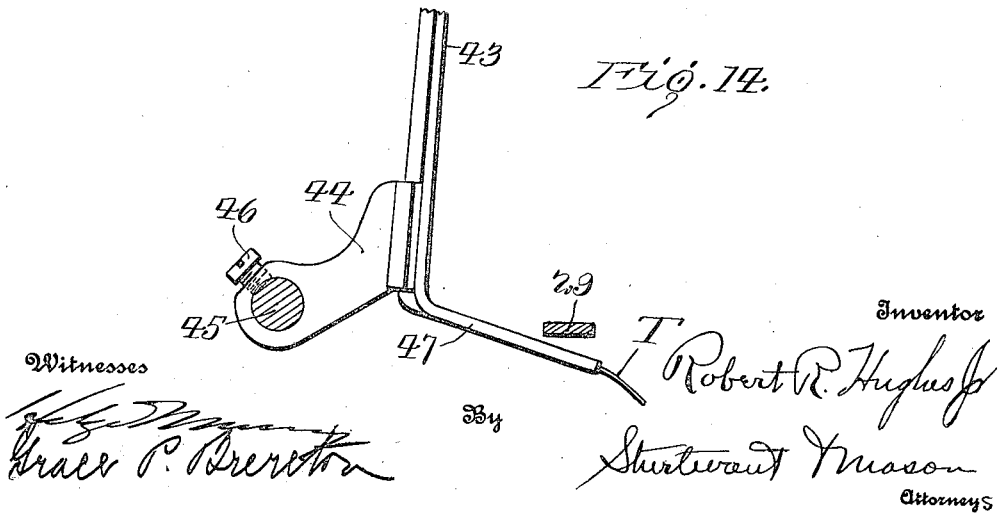

UNITED STATES PATENT OFFICE.

ROBERT R. HUGHES, JR., OF NEW YORK, N. Y., ASSIGNOR TO UNION SPECIAL MACHINE COMPANY, OF CHICAGO, ILLINOIS, A CORPORATION OF ILLINOIS.

EDGING-MACHINE.

1,278,660.

Specification of Letters Patent. Patented Sept. 10, 1918.

Application filed August 19, 1915. Serial No. 46,320.

*To all whom it may concern:*

Be it known that I, ROBERT R. HUGHES, Jr., a citizen of the United States, residing at New York city, State of New York, have invented certain new and useful Improvements in Edging-Machines, of which the following is a description, reference being had to the accompanying drawing, and to the figures of reference marked thereon.

The invention relates to new and useful improvements in sewing machines, and more particularly to a sewing machine which is adapted to form and stitch a projecting edging on to the edge of a fabric.

An object of the invention is to provide a machine of the above character wherein the needles of the stitching mechanism are vibrated laterally for joining the edging threads to the fabric and wherein a tape guide for running a tape through the edging is vibrated laterally in unison with the needle so that a relatively wide tape may be placed in the edging without the tape being caught and stitched by the needles.

A further object of the invention is to provide a machine of the above character with means for raising and lowering the tape guide, so that the tape will extend alternately above and below the cross bars of the edging.

These and other objects will in part be obvious and will in part be hereinafter more fully disclosed.

In the drawings which show by way of illustration one embodiment of the invention, Figure 1 is a front view of a sewing machine embodying my improvements;

Fig. 4 is a vertical sectional view through the supporting bracket for the tape guide and the operating mechanism therefor;

Fig. 5 is a detail partly in section and partly in side elevation, showing the means for raising and lowering the delivering end of the tape guide;

Fig. 6 is a detail partly in plan and partly in section, showing the tape guide at its extreme right-hand position;

Fig. 7 is a similar view showing the tape guide at its extreme left-hand position;

Fig. 8 is a view more or less diagrammatic, showing in side elevation the oscillating arm and coöperating block for moving the tape guide, the tape guide being in its lower position;

Fig. 9 is a similar view showing the tape guide raised;

Fig. 10 is a detail showing the block for oscillating the tape guide and the stop for limiting the movements thereof;

Fig. 11 is a view more or less diagrammatic showing one position of the needles and the thread guiding finger for forming the edging;

Fig. 12 is a similar view showing in full lines another position of said finger and in dotted lines the movement of the same for forming the next loop in the edging thread;

Fig. 13 is a detail showing the relative position of the tape guide and the edging thread guiding finger with the tape guide in its upper position; and Fig. 14 is a similar view with the tape guide in its lower position.

Fig. 15 is a view showing diagrammatically an edging stitched on my machine.

Figure 1:
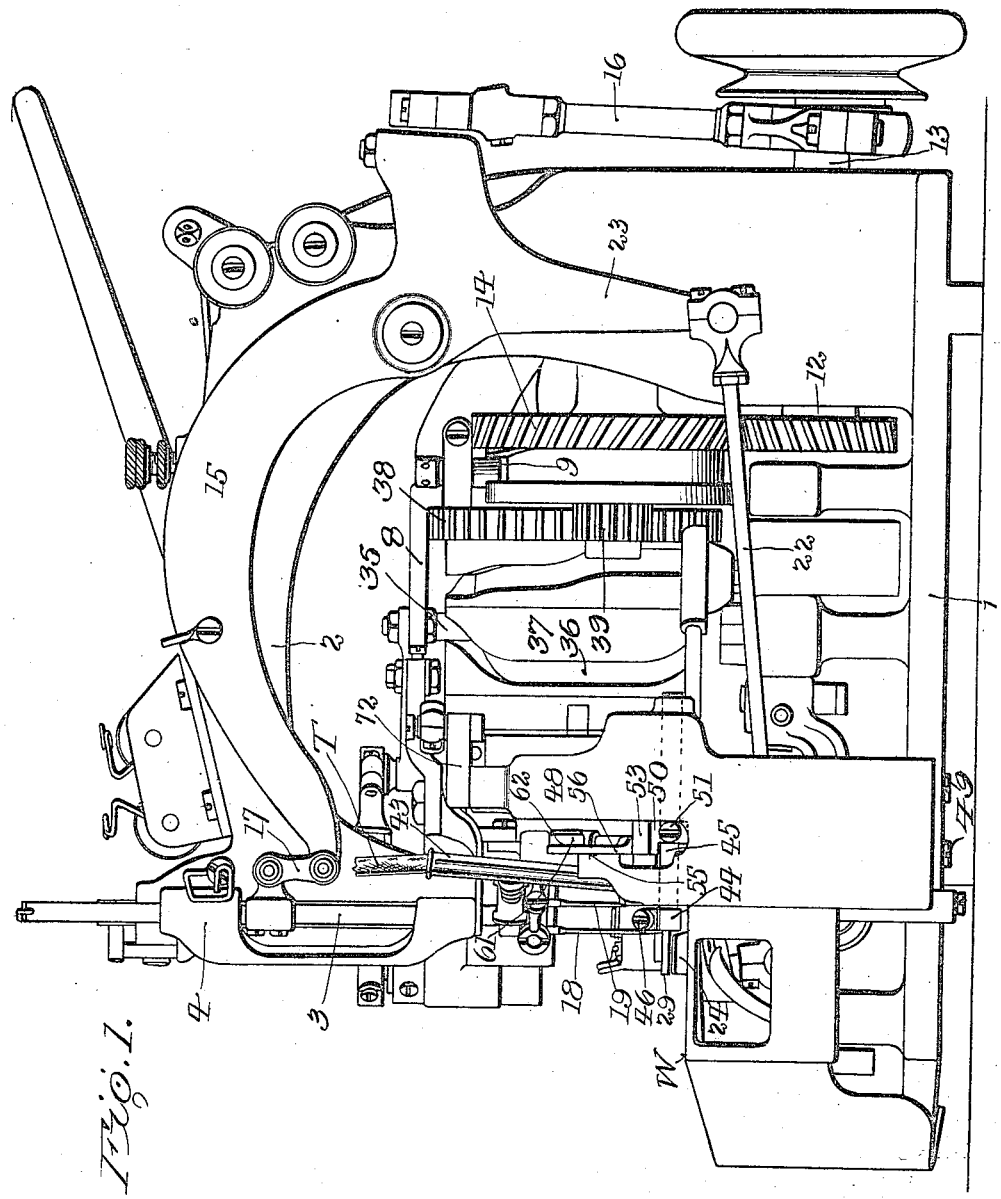

The invention consists broadly in a tape guide and the means for supporting and moving the same in connection with a machine for forming an edging and stitching the same to a fabric. The edging is formed by a thread lying guide which is reciprocated in proper timing with the reciprocations of the needles of the sewing machine, so as to form loops which are attached to the edge of the fabric at intervals. The stitching mechanism preferably consists of two needles which are spaced and which are vibrated laterally, so that one of the needles passes alternately through the fabric and then over the edge of the fabric and one of these over-edge stitches passes into the loop in the edging thread, so that the edging thread is secured to the fabric in such a manner as to lie in the plane of the fabric. The tape guide is moved laterally in unison with the needles, so that a relatively wide tape may be guided which passes alternately over and under the cross-bars of the edging and which will not be pierced by the needles, so that the tape is free throughout the edging.

Referring more in detail to the drawings, my improved machine consists of a supporting bed 1 carrying an overhanging arm 2, in which reciprocates a needle bar 3. The needle bar is mounted in a gate 4 which is pivoted at 5. An arm 6 is fixed to the needle gate 4 and serves as a means for oscillating the same. Said arm is connected by a link 7 to a rock lever 8, which carries a roller stud 9 running in a groove 10 formed in a disk 11 mounted on a stub shaft and operated by a gear 12, carried by the main shaft 13. The gear 12 meshes with the gear 14 on the stub shaft. The needle bar is reciprocated in the oscillating gate by a needle lever 15 which is pivoted to the overhanging arm and is oscillated by a link 16 from an eccentric on the main shaft 13. This lever 15 is connected by a link 17 to the needle bar. The needle bar is provided with two needles 18 and 19. Coöperating respectively with the needles beneath the work support are the loopers 20 and 21, see Fig. 4. These loopers are oscillated by a link 22, which is connected to the needle lever extension 23.

The material is held on the work support W by a presser foot 24, which is provided with needle slots 25 and 26 for the respective needles 18 and 19. Extending into each slot is a thread finger 27. This presser foot 24 is carried by a presser bar 28 mounted in the overhanging arm. The edging for the material is built up by a thread guiding finger 29. This thread guiding finger is secured to a vertical shaft 30, mounted to oscillate in a bracket 31. Said shaft 30 carries a crank arm at its upper end which is connected to a link 32. This link is in turn connected to a lever 33 pivoted at 34 and carrying a stud 35 which has a roller running in a cam groove 36 in the drum 37. This drum 37 is mounted on a shaft carrying a gear 38 which meshes with a gear 39 on the stub shaft carrying the gear wheel 14. The gears 38 and 39 are so proportioned and the cam groove 36 is so shaped that the thread guiding finger remains normally at a dwell at the rear end of its stroke and moves forward to form a loop in the edging thread and present the same to the needles at each fourth reciprocation of the needle bars. Said thread guiding finger is provided with a preferred lug 40 and an eye 41 through which the edging thread is led. This thread guiding finger moves back and forth in a horizontal plane directly above the presser foot.

Also, coöperating with the thread guiding finger and the stitching mechanism is a scallop thread guide 42. This scallop thread guide *per se*, however, forms no part of the present invention and description thereof is not thought necessary.

A tape, indicated at T, in the drawings, is led through a tape guide 43 and is directed between the needles of the stitching mechanism. This tape guide is fixed to a bracket 44, which in turn is fixed to a shaft 45 by a set-screw 46. The lower end of the tape guide is bent rearwardly, as at 47, see Fig. 5. The shaft 45 is mounted in a bracket 48, which is secured to the bed plate 1 by suitable screws 49, which pass up through the bed plate into the bracket. The bracket extends above the work support W so that the tape guide is held entirely above the work support. The shaft 45 is mounted to oscillate and move endwise in its supporting bracket 48. A block 50 is secured to the shaft 45 by a set-screw 51. Said block has its upper face formed with a recess 52 which in reality provides two spaced oppositely disposed arms 53 and 54. The upper face of the block is cut on a curve to form the recess 52 and the arms 53 and 54, as shown in Figs. 8 and 9. Pivoted to the bracket 48 at 55 is an arm 56. Said arm has its lower face rounded off, as at 57. The surface forming the recess 52 is cut on a shorter radius than the distance from the end of the arm 56 to its pivot point, which pivot point is directly above the center of the shaft 45 and, as a consequence, the oscillation of the arm 56 will cause the lower end 57 thereof to swing the block 50 first in one direction and then the other and to hold the block in its extreme positions from return movement. The block is also provided with two spaced lugs 58 and 59 which engage a projecting stop 60 to limit the movement of the block.

Figure 2:
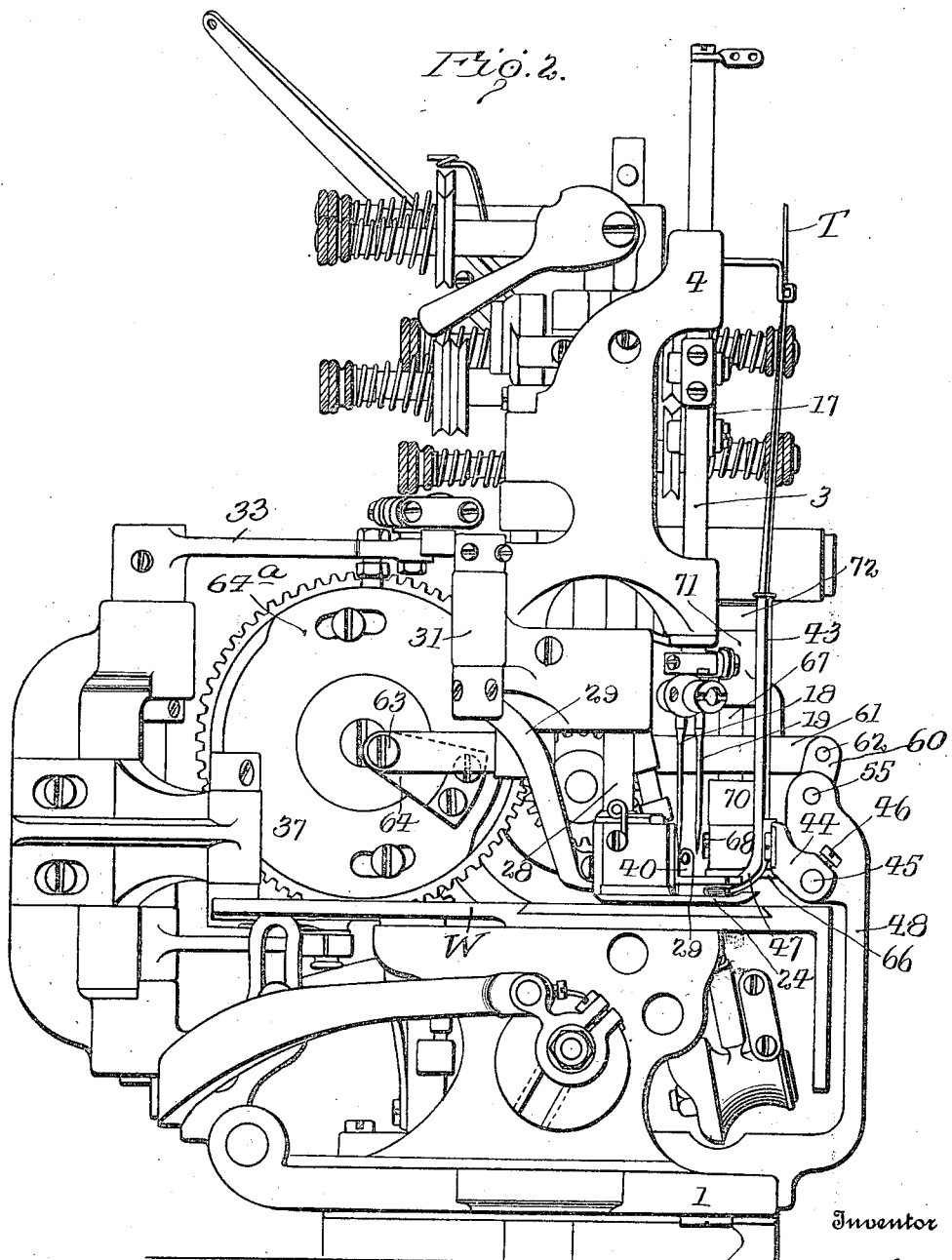
Fig. 2 is an end view of the same.
Figure 3:
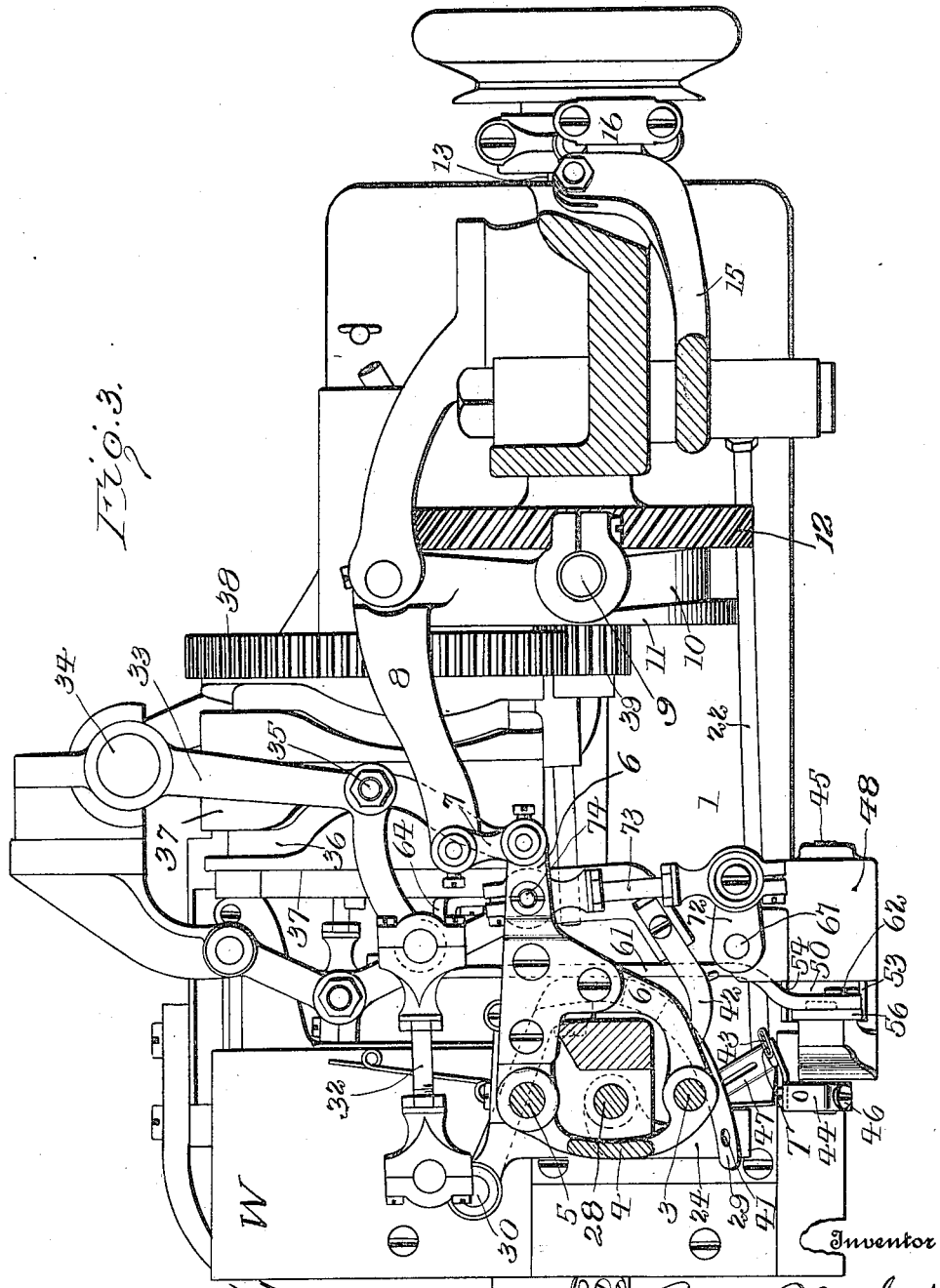
Fig. 3 is a view partly in plan and partly in section, showing the work support and the parts immediately above the same.

From the above, it will be apparent that the swinging of the arm 56 will oscillate the shaft 45 and as the tape guide 43 is fixed thereto, the projecting end 47 of the tape, or the delivering end, will be raised and lowered relative to the work support. The arm 56 is swung by a link 61 which is pivoted at 62 to the arm. The other end of said link is pivoted at 63 to a plate 64 attached to a plate 64ª which is adjustably connected to the drum 37, see Fig. 2. The pivot point 63 is eccentric to the axis of the drum, so that, as the drum rotates, the arm 56 will be oscillated and this will in turn oscillate the shaft 45. This link 61 is made in two sections which are connected by a slot and screw 65, so that the link may be adjusted as to length and this will vary the normal position of the end 47 of the tape guide. In other words, by adjusting the link 61, the vertical position of the tape guide may be set, after which said tape guide will oscillate up and down a given distance, as above described. By adjusting the plate 64ª, these vertical oscillations of the guide may be adjusted for timing purposes relative to the reciprocation of the guide finger 29. The shaft 45 is moved endwise by a segmental gear 66, which is fixed to a shaft 67 by a set-screw 68. This segmental gear 66 meshes with a grooved disk or cylindrical rack 69 which is fixed to the shaft 45. By making this rack cylindrical, the shaft 45 may oscillate without disturbing its connection with the segmental gear 66. This shaft 67 is mounted in bearings 70 and 71 formed in the bracket 48. The upper end of the shaft 67 is provided with a crank arm 72 and a link 73 is pivoted to this crank arm. The rear end of the link 73 is connected to a stud 74 mounted on the arm 6, which vibrates the needle gate, so that as the needle gate vibrates the shaft 67 will be oscillated and this will in turn move the shaft 45 endwise. Inasmuch as the endwise movement of the shaft is derived from the swinging arm of the needle gate, the tape guide will be moved laterally in unison with the lateral movements of the needle.

In Fig. 15 of the drawings, I have shown the fabric F having an edging attached thereto which is formed by an edging thread $e$ and a reinforcing scallop thread $e'$. The needle thread $n$ is carried by the needle 18 and the needle thread $n'$ is carried by the needle 19. The tape T is directed alternately above and below the cross-bars of the edging. The thread guiding finger 29 is moved forward to make a loop and the needles 18 and 19 enter this loop, as shown in Fig. 11 of the drawings, after which the thread guiding finger is retracted. If the tape guide is positioned as shown in Fig. 13, this thread guiding finger 29, when in its forward position for forming its loop for the entrance of the needle, will be underneath the tape T. If, however, this tape guide 43 is oscillated to the position shown in Fig. 14, then the thread guiding finger 29 will be above the tape T and then by the oscillation of the shaft 45 the tape is laid first above and then below the cross or pillar bars of the edging. As shown in Fig. 11, the needle 18, when stepped to the right or over the edge of the fabric, enters the loop formed in the edging thread and, therefore, the edging thread will be joined to the body fabric in a manner so as to lie in the plane of the body fabric.

Referring more particularly to Figs. 6 and 7, it will be noted that when the needles are vibrated to the full extreme right-hand position, as shown in Fig. 6, the tape guide 43 is at the extreme right, so that the needle 18 escapes the edge of the tape, and likewise the needle 19 escapes the edge of the tape, although the right-hand edge of the tape is over the needle slot 26, that is, over the position where the needle 19, if on its left-hand stroke, would pierce the tape. When the needles are vibrated to their extreme left-hand stroke, as shown in Fig. 7, the tape guide is moved to the left, so that the left-hand edge of the tape is over the needle slot 25 and is positioned so that the needle 18, if at the right hand end of its stroke would pierce the same. In other words, by oscillating the tape guide back and forth in unison with the needles, I am able to guide a very much wider tape. If the tape guide is not oscillated, then the extreme width of tape that can be guided will be a little less than the distance between the position of the inner needle and its right-hand stroke and the outer needle at its left-hand stroke. With, however, the oscillation of the tape guide, then the extreme width of the tape may be just a little less than the actual distance between the needles. This permits a very wide tape to be passed through the edging as it is formed without the same being caught by the needles.

It is obvious that minor changes in the details of construction may be made without departing from the spirit of the invention, as set forth in the appended claims.

Having thus described my invention, what I claim as new and desire to secure by Letters-Patent is:—

1. The combination of stitch forming mechanism including a plurality of laterally vibrating needles, means for forming an edging to be stitched by said needles including a thread guiding finger, means for intermittently oscillating the same to form a loop in the edging thread for the entrance of the needles, a tape guide for guiding a tape between the needles, and means for moving said tape guide laterally in unison with the lateral vibrations of the needles.

2. The combination of stitch forming mechanism including a plurality of laterally vibrating needles, means for forming an edging to be stitched by said needles including a thread guiding finger, means for intermittently oscillating the same to form a loop in the edging thread for the entrance of one of said needles, a tape guide for guiding a tape between said needles, means for moving said tape guide laterally in unison with the vibrations of the needles, and means for oscillating said tape guide vertically for positioning the tape above and below said thread guiding finger at alternate oscillations thereof.

3. The combination with stitch forming mechanism including spaced needles, means for vibrating said needles laterally, means for guiding a fabric to one of said needles, whereby the stitches are formed alternately through and over the edge of the fabric, means for forming an edging including a thread guiding finger operating to form a loop in an edging thread for the entrance of said needle on one of its strokes over the edge of the fabric, a tape guide, and means for vibrating said tape guide laterally in unison with the lateral reciprocations of the needles.

4. The combination with stitch forming mechanism including spaced needles, means for vibrating said needles laterally, means for guiding a fabric to one of said needles, whereby the stitches are formed alternately through and over the edge of the fabric, means for forming an edging including a thread guiding finger operating to form a loop in an edging thread for the entrance of one of said needles on one of its strokes over the edge of the fabric, a tape guide for guiding a tape substantially the same width as the distance between the needles, and means for vibrating said tape guide laterally with the needles so as to prevent the needles from entering the tape.

5. The combination with stitch forming mechanism including spaced needles, means for vibrating said needles laterally, means for guiding a fabric to one of said needles, whereby stitches are formed alternately through and over the edge of the fabric, means for forming an edging including a thread guiding finger operating to form a loop in an edging thread for the entrance of said needle on one of its strokes over the edge of the fabric, a tape guide, a shaft for supporting said tape guide, means for oscillating said shaft for raising and lowering the tape guide so as to position the tape above and below said thread guiding finger at alternate oscillations thereof.

6. The combination with stitch forming mechanism including spaced needles, means for vibrating said needles laterally, means for guiding a fabric to one of said needles whereby stitches are formed alternately through and over the edge of the fabric, means for forming an edging including a thread guiding finger operating to form a loop in an edging thread for the entrance of said needle on one of its strokes over the edge of the fabric, a tape guide, a shaft for supporting said tape guide, means for oscillating said shaft for raising and lowering the tape guide so as to position the tape above and below said thread guiding finger at alternate oscillations thereof, and means for moving said shaft endwise for vibrating the tape guide laterally in unison with the movements of the needles.

7. The combination with stitch forming mechanism including spaced needles, means for vibrating said needles laterally, means for guiding a fabric to one of said needles, whereby the stitches are formed alternately through and over the edge of the fabric, means for forming an edging including a thread guiding finger operating to form a loop in an edging thread for the entrance of said needle on one of its strokes over the edge of the fabric, a tape guide, a shaft on which said tape guide is rigidly mounted, a bracket supporting said shaft, means for oscillating said shaft, and means for moving said shaft endwise.

8. The combination with stitch forming mechanism including spaced needles, means for vibrating said needles laterally, means for guiding a fabric to one of said needles whereby stitches are formed alternately through and over the edge of the fabric, means for forming an edging including a thread guiding finger operating to form a loop in an edging thread for the entrance of said needle on one of its strokes over the edge of the fabric, a tape guide, a shaft to which said tape guide is rigidly connected, a link for oscillating said shaft, and means for adjusting the length of said link.

9. The combination with stitch forming mechanism including spaced needles, means for vibrating said needles laterally, means for guiding a fabric to one of said needles whereby stitches are formed alternately through and over the edge of the fabric, means for forming an edging including a thread guiding finger operating to form a loop in an edging thread for the entrance of said needle on one of its strokes over the edge of the fabric, a tape guide, a shaft supporting said tape guide, means for moving said shaft endwise including a segmental gear, a rack carried by the gear and meshing with said segmental gear.

10. The combination with stitch forming mechanism including spaced needles, means for vibrating said needles laterally, means for guiding a fabric to one of said needles whereby stitches are formed alternately through and over the edge of the fabric, means for forming an edging including a thread guiding finger operating to form a loop in an edging thread for the entrance of said needle on one of its strokes over the edge of the fabric, a tape guide, a shaft supporting said tape guide, means for moving said shaft endwise including a segmental gear, a rack carried by the gear and meshing with said segmental gear, and means for oscillating said shaft, said rack being so constructed as to permit said shaft to oscillate without being disconnected from said segmental gear.

11. The combination with stitch forming mechanism including spaced needles, means for vibrating said needles laterally, means for guiding a fabric to one of said needles whereby stitches are formed alternately through and over the edge of the fabric, means for forming an edging including a thread guiding finger operating to form a loop in an edging thread for the entrance of said needle on one of its strokes over the edge of the fabric, a tape guide, means for oscillating said tape guide for positioning the tape above and below said oscillating thread guiding finger at alternate oscillations thereof including a shaft for supporting said tape guide, a block mounted on said shaft, an arm pivoted above said block, said block having a surface curved on a shorter radius than the length of the arm whereby the swinging of the arm will cause the end thereof to engage and swing said block.

12. A sewing machine including in combination a plurality of laterally vibrating needles, means for vibrating said needles, a tape guide for guiding a tape between said needles, and means to vibrate said tape guide laterally with said needles.

13. A sewing machine including in combination a plurality of laterally vibrating needles, means for vibrating said needles laterally in unison, a tape guide disposed in advance of said needles for guiding a tape between the needles, and means to vibrate said tape guide in unison with said needles.

14. A sewing machine including in combination a work support, feeding mechanism, spaced needles disposed in a line inclined to the line of feed, a tape guide in advance of said needles, the longitudinal axis of said tape guide lying in a vertical plane substantially at right angles to said line containing the needles, means to vibrate said needles laterally, and means for vibrating the tape guide laterally for movement in unison with the needles.

15. A sewing machine including in combination spaced needles, means for vibrating said needles laterally in unison, a thread laying finger for laying a cross thread whereby the same is secured by said needles, a tape guide for guiding a tape between the needles, means for swinging said tape guide vertically whereby the tape is guided alternately above and below said thread laying finger, and means for vibrating said tape guide laterally in unison with the needles.

16. A sewing machine including in combination spaced needles, means for vibrating said needles laterally in unison, a thread laying finger for laying a cross thread whereby the same is secured by said needles, a tape guide for guiding a tape between the needles, means for swinging said tape guide vertically whereby the tape is guided alternately above and below said thread laying finger, and means whereby the timing of the swinging of the tape guide may be varied relative to the oscillations of said thread laying finger.

In testimony whereof I affix my signature in the presence of two witnesses.

ROBERT R. HUGHES, Jr.

Witnesses:
S. GEORGE TATE,
A. F. BREDSHALL.

Copies of this patent may be obtained for five cents each, by addressing the "Commissioner of Patents, Washington, D. C."